(12) United States Patent
Taylor et al.

(10) Patent No.: US 8,204,778 B2
(45) Date of Patent: Jun. 19, 2012

(54) BEHAVIORAL PROFILES IN SOURCING AND RECRUITING AS PART OF A HIRING PROCESS

(75) Inventors: Jason-Jno Engene Taylor, Wylie, TX (US); Mark Ellis, Dallas, TX (US)

(73) Assignee: PeopleAnswers, Inc., Dallas, TX (US)

( * ) Notice: Subject to any disclaimer, the term of this patent is extended or adjusted under 35 U.S.C. 154(b) by 1210 days.

(21) Appl. No.: 11/771,704

(22) Filed: Jun. 29, 2007

(65) Prior Publication Data
US 2009/0006178 A1    Jan. 1, 2009

(51) Int. Cl.
*G06Q 10/00* (2012.01)
(52) U.S. Cl. .................. 705/7.38; 705/7.17; 705/7.39
(58) Field of Classification Search .............. 1/1; 705/8, 705/11; 706/60
See application file for complete search history.

(56) References Cited

U.S. PATENT DOCUMENTS

| | | | |
|---|---|---|---|
| 5,326,270 A | 7/1994 | Ostby et al. | |
| 5,551,880 A * | 9/1996 | Bonnstetter et al. | 434/236 |
| 6,275,812 B1 * | 8/2001 | Haq et al. | 705/11 |
| 6,385,620 B1 * | 5/2002 | Kurzius et al. | 1/1 |
| 6,873,964 B1 | 3/2005 | Williams et al. | |
| 7,080,057 B2 * | 7/2006 | Scarborough et al. | 706/60 |
| 7,121,830 B1 * | 10/2006 | Kaplan et al. | 434/219 |
| 7,606,778 B2 | 10/2009 | Dewar | |
| 2001/0034011 A1 * | 10/2001 | Bouchard | 434/236 |
| 2002/0055866 A1 * | 5/2002 | Dewar | 705/8 |
| 2002/0198766 A1 * | 12/2002 | Magrino et al. | 705/11 |
| 2003/0037032 A1 * | 2/2003 | Neece et al. | 707/1 |
| 2003/0191680 A1 | 10/2003 | Dewar | |
| 2003/0195786 A1 * | 10/2003 | Dewar | 705/8 |
| 2003/0200136 A1 | 10/2003 | Dewar | |
| 2005/0033633 A1 * | 2/2005 | LaPasta et al. | 705/11 |
| 2006/0031115 A1 * | 2/2006 | Eisma et al. | 705/11 |
| 2006/0282306 A1 * | 12/2006 | Thissen-Roe | 705/11 |
| 2009/0187446 A1 | 7/2009 | Dewar | |
| 2010/0042574 A1 | 2/2010 | Dewar | |

OTHER PUBLICATIONS

Lee, Raymond and Foley, Paul P., "Is the Validity of a Test Constant Throughout the Test Score Range?", Journal of Applied Psychology, 1986, pp. 641-644, vol. 71, No. 4, American Psychological Association, Inc.

Brown, Steven H, et al., "Stability of Validity Indices Through Test Score Ranges", Journal of Applied Psychology, 1988, pp. 736-742, vol. 73, No. 4, American Psychological Association, Inc.

(Continued)

*Primary Examiner* — Thomas Dixon
*Assistant Examiner* — Gerald Vizvary
(74) *Attorney, Agent, or Firm* — Conley Rose, P.C.

(57) ABSTRACT

A method of selecting potential hires for progression through a hiring process is provided. The method comprises selecting at least one performance indicator for a position, obtaining the at least one performance indicator for a plurality of incumbents in the position, and placing each incumbent in the plurality of incumbents along a performance continuum according to their performance indicator. The method also comprises surveying incumbents from at least both halves of the performance continuum, generating an ideal profile for the position based upon the incumbent survey and the at least one performance indicator of the incumbents, using a survey to generate a candidate profile of a potential hire, comparing the candidate profile of the potential hire with the ideal profile for the position to determine a result for the potential hire, and determining whether to progress the potential hire to a next stage in the hiring process based upon the result.

30 Claims, 10 Drawing Sheets

OTHER PUBLICATIONS

Waldman, David A. and Avolio, Bruce J., "Homogeneity of Test Validity", Journal of Applied Psychology, 1980, pp. 371-374, vol. 74, No. 2, American Psychological Association, Inc.

Detrick, Paul; Chibnall, John T., "NEO PI-R Personality Characteristics of High-Performing Entry-Level Police Officers", Psychological Services, 2006, pp. 274-285, American Psychological Association.

Decorte, Wilfried, "Weighing Job Performance Predictors to Both Maximize the Quality of the Selected Workforce and Control the Level of Adverse Impact", Journal of Applied Psychology, 1999, pp. 694-702, vol. 84, No. 5, American Psychological Association, Inc.

Search results for query: [KW=profile and KW=(personnel selection)], May 23, 2007.

Search results for query: [Wonderlic and KW=(personnel selection)], May 23, 2007.

Search results for query: [(personality profile) and (personnel selection)], May 23, 2007.

Search results for query: [(score range) and personnel], May 23, 2007.

Search results for query: [(applicant profile) and personnel], May 23, 2007.

Search results for query: [KW=(curvilinear or nonlinear) and KW=(personnel selection)], May 23, 2007.

Search results for query: [(maximum score) and personnel], May 22, 2007.

Search results for query: [KW=(high score) and KW=(personnel selection)], May 23, 2007.

Search results for query: [(cutoff range) and personnel], May 22, 2007.

LexisNexis(TM) Academic document, *Robert Jordan* v. *City of New London and Keith Harrigan*, No. 99/9188, United States Court of Appeals for the Second Circuit, 2000 U.S. App. LEXIS 22195, Aug. 23, 2000, Decided, http://web.lexis-nexis.com/universe/printdoc, May 23, 2007.

* cited by examiner

BEHAVIORAL PROFILES IN SOURCING AND RECRUITING AS PART OF A HIRING PROCESS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A critical component of the success for any organization is the ability to keep the cost of doing business and growing business at a minimum. Sourcing and recruiting of employees represent a very substantial cost with poor results through turnover and lack of excellent performers and can lead to erosion of the bottom line. The costs associated with identifying and hiring a replacement for a vacant position include advertising, an employment agency, employee referral award, Internet posting and other forms of announcing the availability of the position. At the next stage, interviews conducted by management and/or hiring department staff will cost money in terms of the time that they spend arranging for interviews, conducting the interviews, calling references, having discussions about the people they met, and notifying candidates who did not get the job.

For growing organizations, hiring people who are efficient, reliable, and excellent performers for new positions can also reduce the cost of doing business. Such employees can help reduce cost by allowing an organization to operate with a smaller workforce and reduced downtime. Therefore, hiring the right people is a necessity for any organization in order to reduce the cost of doing business.

SUMMARY

These and other features will be more clearly understood from the following detailed description taken in conjunction with the accompanying drawings and claims.

In an embodiment of the disclosure, a method of selecting potential hires for progression through a hiring process is provided. The method comprises selecting at least one performance indicator for a position, obtaining the at least one performance indicator for a plurality of incumbents in the position, and placing each incumbent in the plurality of incumbents along a performance continuum according to their performance indicator. The method also comprises surveying incumbents from at least both halves of the performance continuum, generating an ideal profile for the position based upon the incumbent survey and the at least one performance indicator of the incumbents, using a survey to generate a candidate profile of a potential hire, comparing the candidate profile of the potential hire with the ideal profile for the position to determine a result for the potential hire, and determining whether to progress the potential hire to a next stage in the hiring process based upon the result.

In another embodiment of the disclosure, a system for selecting potential hires for progression through a hiring process is provided. The system comprises a survey completed by a potential hire for a position and a plurality of incumbents in the position, the plurality of incumbents including both high performers and low performers relative to an identified performance indicator. The system also comprises a candidate profile of the potential hire generated by analyzing the survey completed by the potential hire, an ideal profile for the position generated by analyzing the surveys completed by the plurality of incumbents, and a result for the potential hire generated by comparing the candidate profile of the potential hire with the ideal profile for the position, wherein a determination of whether to progress the potential hire to a next stage in the hiring process is made based upon the result.

In another embodiment of the disclosure, a method of determining an ideal range for a behavioral trait for a position at a company is provided. The method comprises having a plurality of incumbents in a position complete a survey comprising a group of two or more items, the group of items corresponding to the behavioral trait, and the plurality of incumbents including both high performers and low performers relative to an identified performance indicator. The method also comprises plotting the results of the survey for the plurality of incumbents on a continuum, determining an ideal range for the behavioral trait based upon the results of the high performers, and determining where the ideal range falls on the continuum, wherein the ideal range is between but not inclusive of the endpoints of the continuum.

In another embodiment of the disclosure, a method of determining the more effective source for sourcing candidates is provided. The method comprises receiving a first group of candidates for a position from a first source and receiving a second group of candidates for the position from a second source. The method also comprises generating an ideal profile for the position based upon an incumbent survey of a group of incumbents in the position and an at least one performance indicator of the incumbents, and generating a candidate profile based upon a candidate survey for each candidate in both groups. The method also comprises determining a result for each candidate in both groups based upon the comparison of the candidate survey with the ideal profile and tracking a measurement of candidates from each group that receive results over a threshold result. The method also comprises using the measurement of candidates from each group that receive results over the threshold result to determine whether the first or the second source is the more effective source for sourcing candidates and selecting the more effective source for sourcing candidates based on the measurement of candidates.

In another embodiment of the disclosure, a method for generating a condensed survey is provided. The method comprises creating a database comprising a plurality of dimensions, each dimension comprising two or more items associated with a behavioral trait. The method also comprises determining a first subset of dimensions from the plurality of dimensions that is most predictive of a fit with a first position, generating a first condensed survey from the first subset of dimensions, determining a second subset of dimensions from the plurality of dimensions that is most predictive of a fit with a second position, and generating a second condensed survey from the second subset of dimensions. In an embodiment, a potential hire is either administered the first or the second condensed survey depending upon whether the potential hire is being considered for the first or second position.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
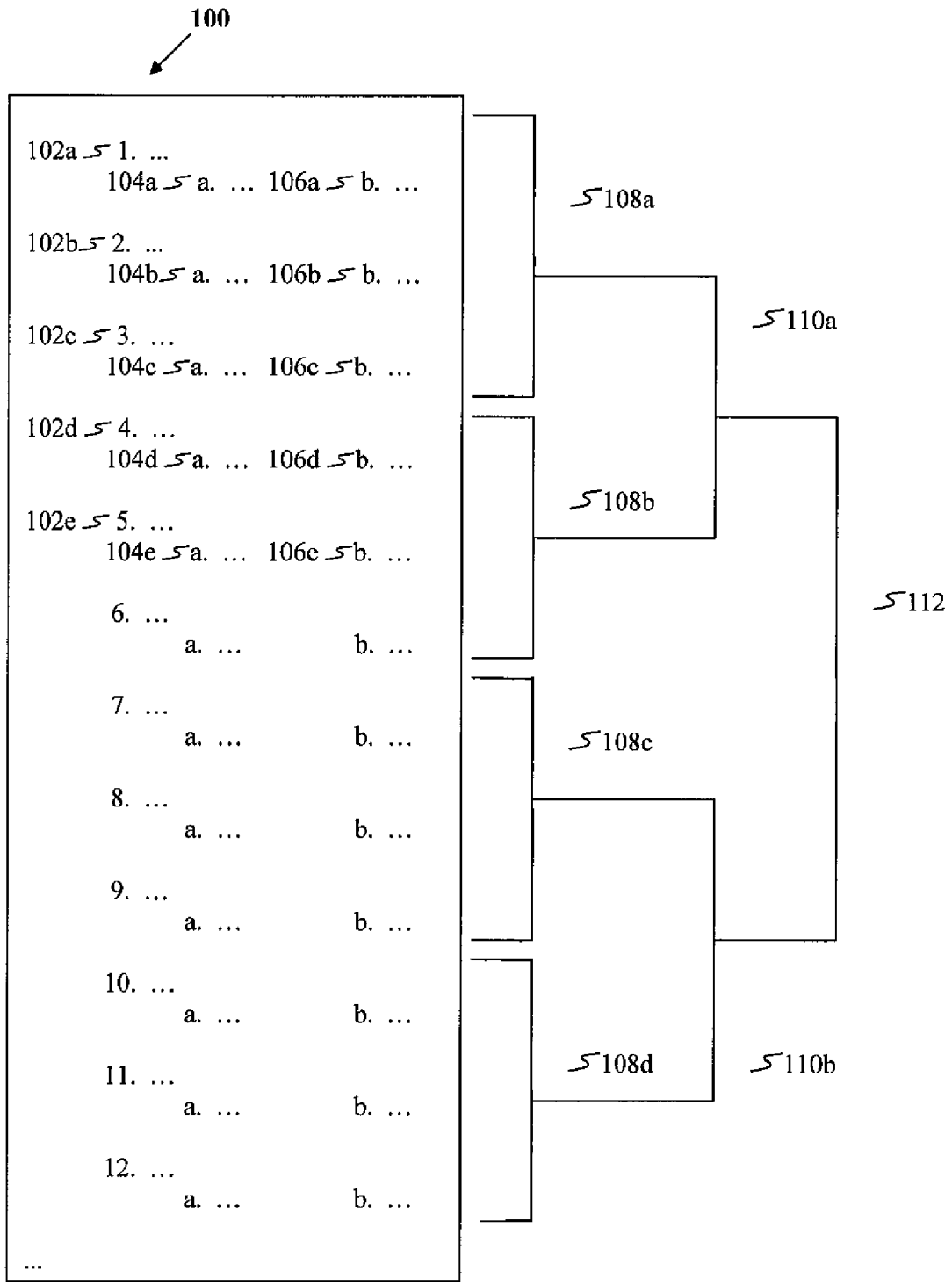
FIG. 1 illustrates an embodiment of the relationship of the individual questions in a survey to the overall hierarchy.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

When filling a vacant or new position, an organization typically relies upon the information provided by a candidate on his or her resume or job application. The organization then makes a decision on whether to progress the candidate through the hiring process based upon this limited information. One embodiment of the disclosure provides a method and system for evaluating a candidate by determining the degree to which the candidate possesses certain behavioral traits that are predictive of their performance in a particular role. This provides an organization with a better feel and understanding of the candidate and how they will perform in a particular role. This evaluation is made by administering a survey to a candidate. A candidate profile for the candidate is then created using the answers provided by the candidate on the survey. The candidate profile is then compared to an ideal profile for the position that is generated by surveying a range of incumbents in that position. In a typical embodiment, the ideal profile includes ranges of desirable scores for each behavioral trait and relative weightings of the significance of the traits. The closer a candidate's profile is to the ideal profile, the better the fit the candidate is deemed to be for the position.

One system and method of the disclosure provides an organization with a way to evaluate a candidate by administering a shorter, more concise survey that focuses on certain behavioral traits that are determined to be most predictive of a fit with a particular position. The condensed survey is generated by selecting questions that are known to measure the behavioral traits of interest based on incumbent surveys.

Also, when multiple sources are used to fill a vacant or new position, one embodiment of the disclosure provides an organization with a way to determine the most effective source of sourcing candidates for a vacant or new position. The disclosure provides for tracking candidates from multiples sources and noting the number of quality candidates from each source. The organization is then provided with information, such as the total cost for each source, the total number of candidates received from each source, the number of quality candidates from each source, and the cost per quality candidate from each source. The organization can then use the information provided by this system and method of the disclosure to make a determination regarding which source or sources provide them with the best return on their investment.

As stated earlier, a significant cost associated with filling a vacant or new position is in the selection of candidates to progress through the hiring process. When a position becomes vacant or a new position is created in an organization, multiple sources are typically utilized to fill the position. These sources include newspapers, Internet postings, and employment agencies. Most of these sources focus on the quantity of candidates produced rather than the quality of the candidates produced. Accordingly, most sources will produce a large number of candidates from which typically only a few would merit an interview. The challenge for the organization then becomes determining which candidates among the large pool of candidates merit the time and expense of an initial or follow-up interview or more directly which candidates merit a job offer.

An important factor to consider in selecting candidates for interview is how well the candidate's behavioral traits fit into the particular environment of an organization. Every organization has a work environment or "culture" that is unique to that organization. Accordingly, behavioral traits that may help a candidate in one organization may not help that candidate in another organization. Furthermore, different positions even within the same organization may emphasize different behavioral traits. The better the fit of a candidate's behavioral traits with the position and organization, the better the chance the candidate will have of performing well at that position. Better performance leads to longer retention. Longer retention leads to a reduction in the cost associated with employee turnover. Better performance also leads to a more productive and efficient workforce. Therefore, it is important to take a candidate's behavioral traits into consideration when deciding which candidates to interview because the time and expense associated with interviews should not be spent on candidates with behavioral traits that would make it difficult for them to succeed at a particular position within an organization. Accordingly, developing a profile of the organization will help to determine how well a particular candidate will fit in with the organization.

Generating a Company Profile

FIG. 1 illustrates an embodiment of the relationship of the individual questions in a survey 100 to the overall hierarchy. Survey 100 would be administered to the incumbent employees of an organization to develop a profile of the organization. Survey 100 comprises a plurality of questions or items 102. Each item 102 has at least two possible answers or item options 104 and 106 associated with the item 102. Each item 102 is also associated with a dimension 108, which is comprised of two or more items. Each dimension 108 is associated with a particular behavioral trait.

Behavioral traits may include high energy, numeric reasoning, independent, analytical, high need of recognition, detailed oriented, mature, verbal reasoning, dependent on others, ambition, emotionally consistent, discipline, introverted, disorganized, introverted, disorganized, pessimistic, subjective, inflexible, idealistic, low energy, conscientious, cooperative, accepting of authority, low need of recognition, irresponsible, immature, rebellious, competitive, apathy, emotionally inconsistent, long-range thinking, risk taker, organized, optimistic, mental flexibility, objective, flexible, and realistic. Behavioral traits may also include personality traits such as honesty, integrity, reliability, affability, and compassion. While specific labels are applied to the various exemplary traits, one of ordinary skill in the art would recognize that other behavioral traits or similar traits with different nomenclature could equally be useful.

Each dimension 108 is then associated with a composite 110, which is comprised of two or more dimensions 108. Examples of composites include interpersonal style, work style, and culture fit. Furthermore, two or more composites may be grouped together to form a parent composite 112.

While items 102 are depicted as having two item options 104 and 106 for ease of illustration, persons of ordinary skill in the art will recognize that items 102 may have any number of item options associated with them. Similarly, each dimension 108 may be associated with any number of items 102, and each composite 110 may be associated with any number of dimensions 108. Further, while each item 102 is shown as associated with a single dimension 108, persons of ordinary skill in the art will recognize that in some circumstances, it may be beneficial for an item 102 to be associated with more than one dimension 108. Similarly, a dimension 108 may be associated with more than one composite 110. While the present embodiment is described in terms of items, dimensions, and composites, one of ordinary skill in the art will recognize that any number of intermediate groupings may be implemented.

Survey 100 is administered to a group of the organization's incumbent employees. The incumbent employees surveyed preferably include a range of performers rather than simply the high performing employees with regard to a performance indicator, a set of performance indicators, or a performance index reflecting a set of performance indicators for a particular situation. The performance indicator can be sales numbers, such as number of sales, dollars in sales, and units sold. The performance indicator can also be call center numbers, such as calls answered, calls returned, and resolutions on first call. Individual contribution numbers may also be a performance indicator. Individual contribution numbers could include throughput, error rate, and quality score. Another performance indicator could be management numbers, such as store sales, number of employees, number of direct reports, or total number of reports. Customer service numbers, such as number of complaints, number of compliments, and amount of gratuity, could also be a performance indicator. Numbers received during training could also be a performance indicator. The training numbers could include time spent in training, whether training was successfully completed, and rank or scores in training. These performance indicators could be considered direct performance indicators because they provide a way of measuring performance. Performance could also be measured by indirect performance indicators, such as tenure and number of human resources complaints, which for the purposes of this disclosure will be included in the general description of "performance indicators" or within the set of performance indicators. One of ordinary skill in the art will recognize that any type and number of performance indicators could be used as the performance indicator.

It is preferably that the surveyed sample includes both relatively high and relatively low performers with regard to the performance indicator. Some samples may include high, mid, and low performing incumbents. The sample could be developed randomly or could be a controlled sample to insure certain numbers or percentage of surveys from different points within the performance continuum.

Figure 2:
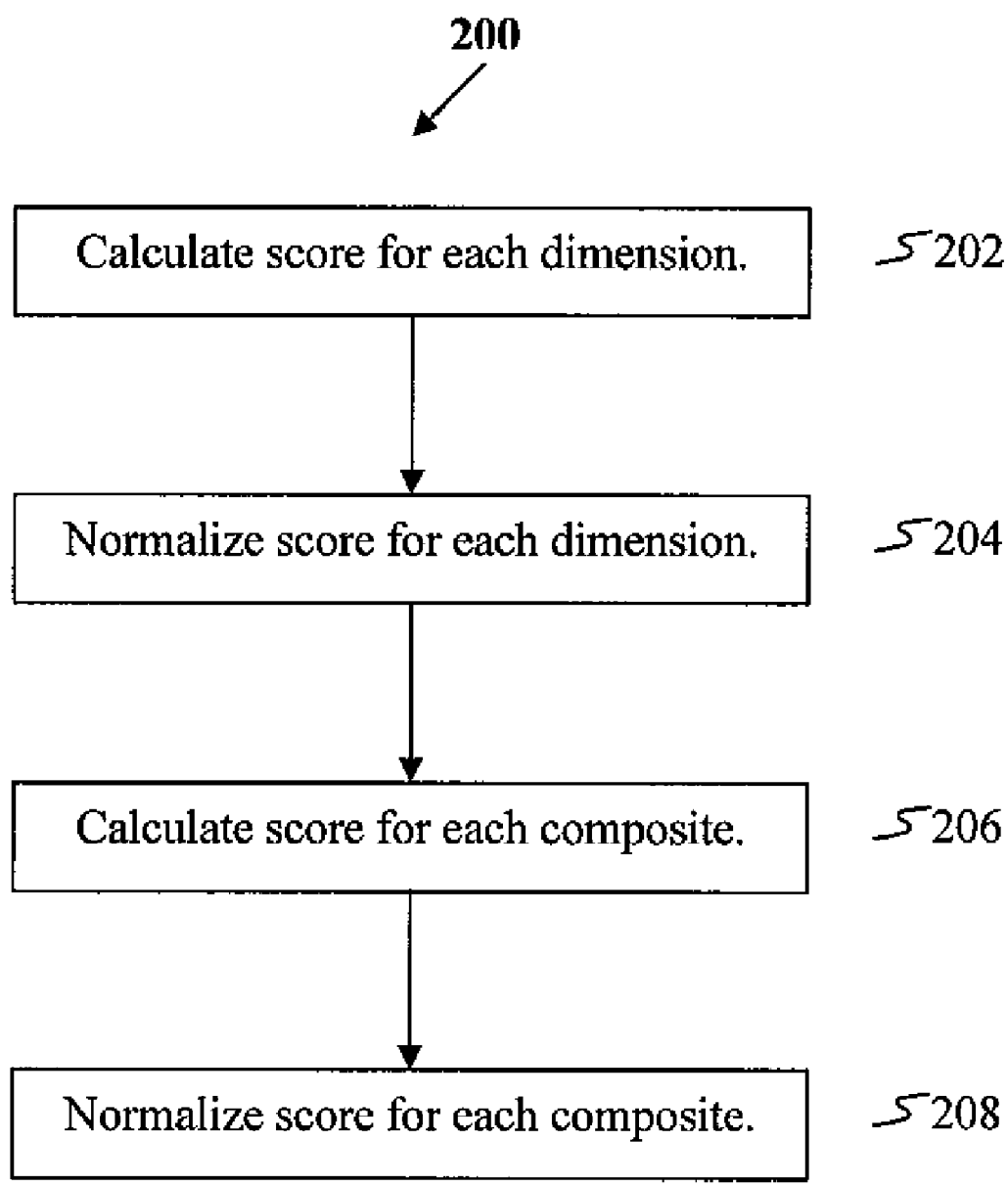
FIG. 2 shows a method for scoring a survey according to an embodiment of the disclosure.

Once survey 100 has been administered to the group of incumbent employees, FIG. 2 shows a method 200 for scoring survey 100 according to an embodiment of the disclosure. As established earlier, each item will have two or more item options associated with it. In this case, each item 102 has two item options 104 and 106. Upon the selection of an item option, the candidate taking the survey will receive the numeric score associated with the selected item option. This allows an organization to assign different weights to different items by the numeric scores associated with the items. The score for each dimension is calculated by summing the scores received for all of the items associated with the dimension and dividing the sum by the total possible score for that dimension (block 202). The score for each dimension is then normalized to a range from 0 to a certain number (block 204). After each dimension has been normalized, the score for each composite is calculated by taking a weighted average of all of the dimensions associated with the composite (block 206). As stated earlier, each dimension is associated with a particular behavioral trait such as high energy, numeric reasoning, analytical, or discipline. Therefore, by taking a weighted average, certain behavioral traits can be given more emphasis depending upon the position and organization involved. This emphasis can be accomplished by simply increasing the weight of the dimensions associated with the behavioral traits of greater interest. The weighted average for each composite is then normalized on a range from 0 to the average number of standard deviations or some other defined number (block 208).

Figure 3:
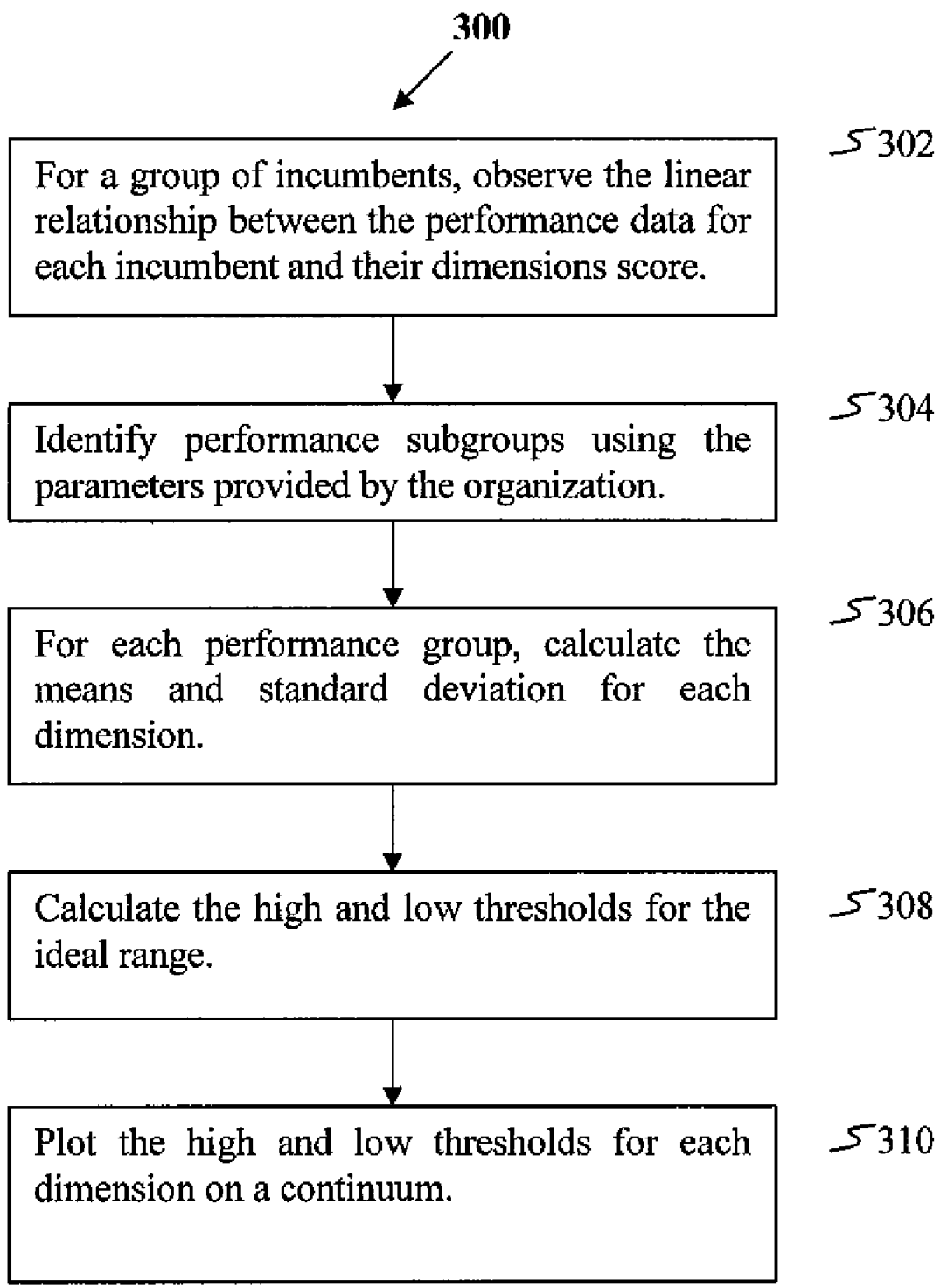
FIG. 3 shows a method for using a survey to generate a profile of an organization according to an embodiment of the disclosure.

The following steps occur after the behavioral characteristic (dimension) scores for the incumbent employees have been calculated. FIG. 3 shows a method 300 for using survey 100 to generate a profile of an organization according to an embodiment of the disclosure. The ideal profile creation process is a multi-algorithmic layered approach. In combination, algorithms are layered to create decision rules which in turn detect natural behavioral patterns when pairs of individual assessment data (dimensions) and performance indicators (data) are analyzed. This process yields a behavioral pattern that represents optimal performance in a given situation. Through this process, the output is consistent, and an end user is able to understand and interpret the method used by the system to arrive at the results. The ideal profile creation system is designed to detect behavioral patterns that lend themselves to success in a given situation. The layered algorithmic process is not designed to predict future outcomes such as an individual's future tenure in a given position. Unlike systems that employ neural networks, the data is examined to detect behavioral patterns or parameters designed to reflect optimal performance. Neural networks tend to "over train" or "over fit" relationships among data that predict unrealistic predictions. Additionally, a neural network is typically not capable of providing a sound repeatable explanation or theoretical framework for the prediction outcome generated. Because of this tendency to find data relationships even where one does not exist, the results given by neural networks are not always consistent or comprehensible, and a user does not always understand how the results were determined. Additionally, the end user of a traditional neural network is not able to provide deeper insight into the reasoning behind the fit or non-fit of a person to a particular situation. Therefore, the results obtained from a neural network are not able to be leveraged in latter parts of an interview process or in the future development of an employee.

Nonetheless, one of ordinary skill in the art will realize that while some advantages may be lost, certain advantages of other embodiments of the disclosure may still be obtained using neural networks.

When constructing an ideal profile (behavioral pattern), the objective is to determine the ideal range for each dimension on a continuum from low to high. This ideal range can be described as the optimal bandwidth existing on a continuum that includes an abundance of higher performers while maintaining the greatest distance from other identified subgroups. An additional objective of constructing a behavioral pattern is to determine the relative importance of each dimension being utilized. The algorithms may use many factors to determine the importance (weight) of each dimension. Factors such as the strength of the relationship among paired sets of data (dimension data and performance indicator data), the variance of proven performance in the position, the distance between performance subgroups, and other unique factors associated with the behavioral data are collected. When calculating the ideal range, the linear relationship between paired sets of data is observed (block 302). The magnitude of the relationship is the focal point not the direction. Both positive and negative relationships between paired data sets are valuable. Additionally, performance subgroups are identified using the parameters provided by the organization (block 304). Next, the means and standard deviations for the high performing and other performance subgroups for each dimension are calculated (block 306). The mean and standard deviations are leveraged as a starting point for a correction procedure (adjustment process of identifying the optimal position of the ideal range along the continuum) of identified dimensions. The correction procedure is designed to exclude outliers in order to obtain the optimal bandwidth that captures the highest volume of high performers while excluding the highest volume of alternative performance subgroups. Simultaneously, the ideal range is centered on the greatest distance from alternative performance subgroups. For effective correction, the direction of the correction will depend upon the sign or direction of the relationship.

Correction Procedure

Once any variance calculation, such as the standard deviation, of the high performing subgroup (starting point) for each dimension has been calculated, the high and low thresholds for the ideal range are calculated with guidance obtained from the direction or sign of the relationship (block 308). For example, if the relationship between a paired set of data was positive, the high threshold for the high performers may be calculated by multiplying any value (larger than the multiple used to obtain the low threshold), such as the standard deviation, by a number and adding that product to the average dimension score. The low threshold may be set by multiplying any value (smaller than the multiple used to obtain the high threshold), such as the standard deviation, by a number and subtracting that product from the average dimension score for the high performers. Conversely, in the case of a negative relationship between a paired set of data, the high threshold for the high performers would be calculated by multiplying any value (smaller than the multiple used to obtain the low threshold), such as the standard deviation, by a number and subtracting that product from the average dimension score. The low threshold may be set by multiplying any value (larger than the multiple used to obtain the high threshold), such as the standard deviation, by a number and subtracting that product from the average dimension score. In either case, the mean is corrected to obtain the optimal range for each dimension, and the ideal range is tightened in the optimal direction. The high and low thresholds for each dimension would then be plotted on a continuum (block 310). The distance between the high and low thresholds may then be designated as the ideal range for that position such that the ideal range is not inclusive of the endpoints of the continuum.

By design, the ideal profile captures an optimal amount of each dimension in the ideal profile. As a result, it is possible to score more than the desirable amount for any given dimension. For example, an individual may have very high energy, and the ideal profile may call for high energy but not too high energy. Thus, the individual may have difficulty being successful in the role because they may be seen as hyperactive and not able to slow down and move through the work related tasks in a steady pace even in a role or position where higher energy is generally viewed as desirable.

Figure 4:
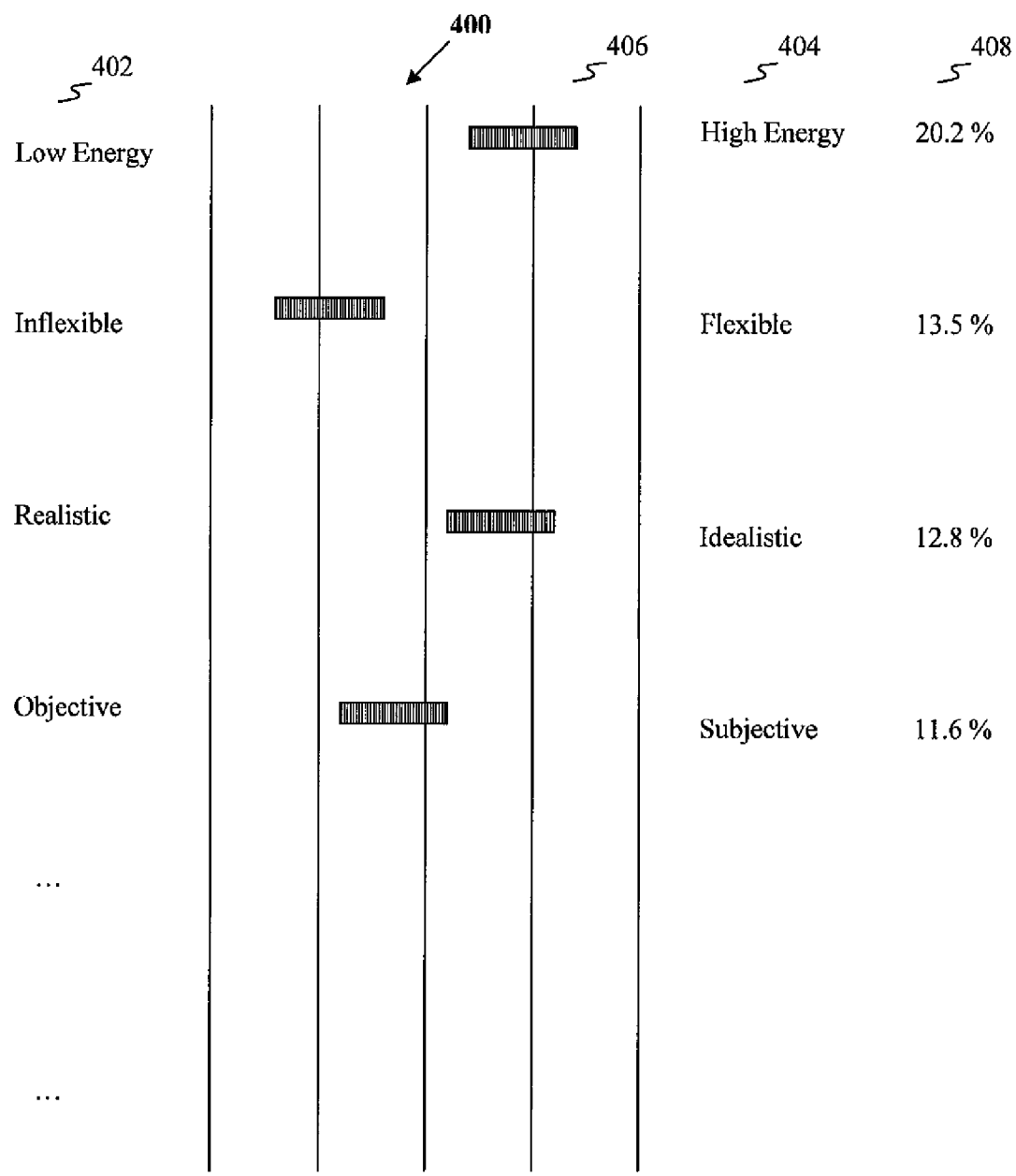
FIG. 4 is an illustration of ideal ranges plotted on a continuum according to an embodiment of the disclosure.

FIG. 4 is an illustration of ideal ranges plotted on a continuum 400 according to an embodiment of the disclosure. In this embodiment, a first side 402 represents one end of a behavioral trait, and a second side 404 represents the opposite end of the behavioral trait. For example with regard to energy, low energy would represent one side of the behavioral trait, and high energy would represent the other side of the behavioral trait. Between first side 402 and second side 404, an ideal range 406 for the particular behavioral trait is given. Again, ideal range 406 is determined by the scores for the high performers as described earlier and is most typically not inclusive of the endpoints of continuum 400. Continuum 400 also shows a weight 408 associated with each behavioral trait. Continuum 400 depicts the profile of the organization with regard to these behavioral traits. While continuum 400 shown as having only four behavioral traits for ease of illustration, persons of ordinary skill in the art will recognize that continuum 400 may have any number of behavioral traits associated with it.

Generating an Assessment Report for a Candidate

Once the profile for the position in the organization has been created and a candidate for the vacant position with the organization has completed survey 100, a candidate assessment is generated by comparing the candidate's dimension values to the profile for the particular position. Each position is supported by a profile that determines how each candidate dimension is rated and how the dimension ratings are combined. Profiles provide three pieces of information: the ideal value, the distribution length, and the weight. The ideal value is the optimal value for a candidate for a particular dimension. The closer a particular candidate's dimension value is to the ideal value, the better the candidate's match is for that particular dimension. The ideal value can be obtained by assessing the high performers currently in the position or can be provided by the organization itself. The distribution length indicates how the distance between the candidate's dimension value and the ideal dimension value affects the rating to be assigned to the candidate's dimension. Typically, the larger the distribution length, the less effect there is of separation from the ideal value. The weight indicates how important a dimension is as a component of the overall assessment rating for a candidate. Weight does not affect the computation of an individual dimension rating. Rather, it is applied when combining dimension ratings to assign the relative importance of the dimension in the profile. Weight can be thought of as the percentage contribution of a particular dimension towards the overall assessment rating. Profiles for different positions may have different values for these for these measures, but the process for using the data remains the same.

Figure 5:
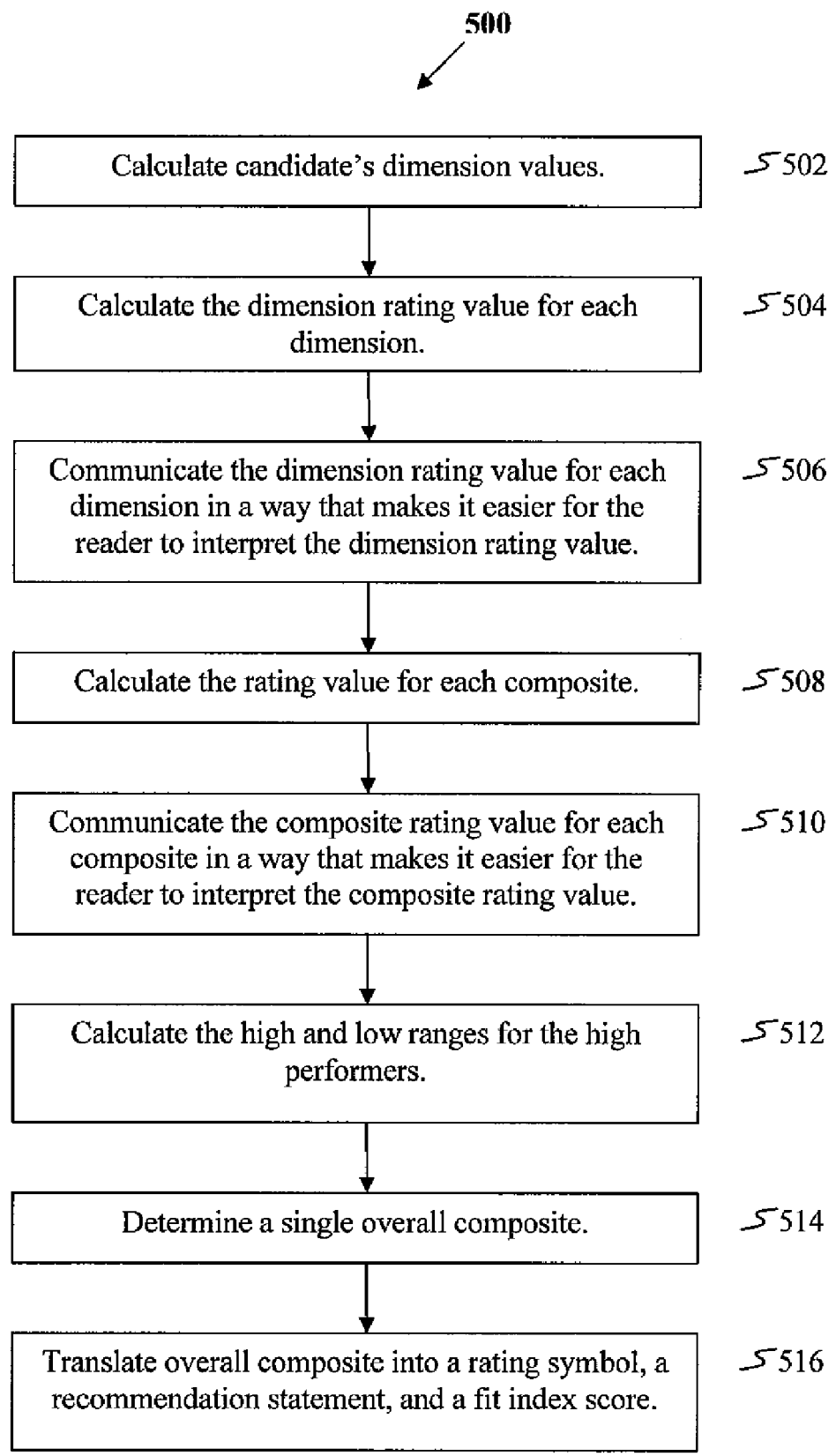
FIG. 5 shows a method for assessing a candidate according to an embodiment of the disclosure.

FIG. 5 shows a method 500 for assessing a candidate according to an embodiment of the disclosure. The assessment begins by calculating the candidate's dimension values based upon answers given by the candidate during a test session (block 502). The dimension rating value for each dimension is then calculated as the number of distribution lengths that the candidate's dimension value is away from the ideal value (block 504). The smaller the rating value, the better match it represents. Each dimension rating value is then communicated to the assessment reader in a way that makes it easier for the assessment reader to interpret the dimension rating value (block 506). For example, dimension rating values within a first range of the ideal dimension values may be associated with a color symbol. Dimension rating values outside of the first range but within a second larger range of the ideal dimension values may be associated with a different color symbol. The dimension rating values outside of the second larger range would then be associated with a color symbol different from the first two color symbols. Therefore, by simply looking at the color symbols, an assessment reader can easily interpret the dimension rating values for the candidate. Though the ratings values are grouped and associated with symbols in this manner, the full numeric rating value for each dimension is typically maintained internally as a decimal number to increase numeric precision and overall assessment accuracy although this is not necessary in all embodiments.

Figure 6:
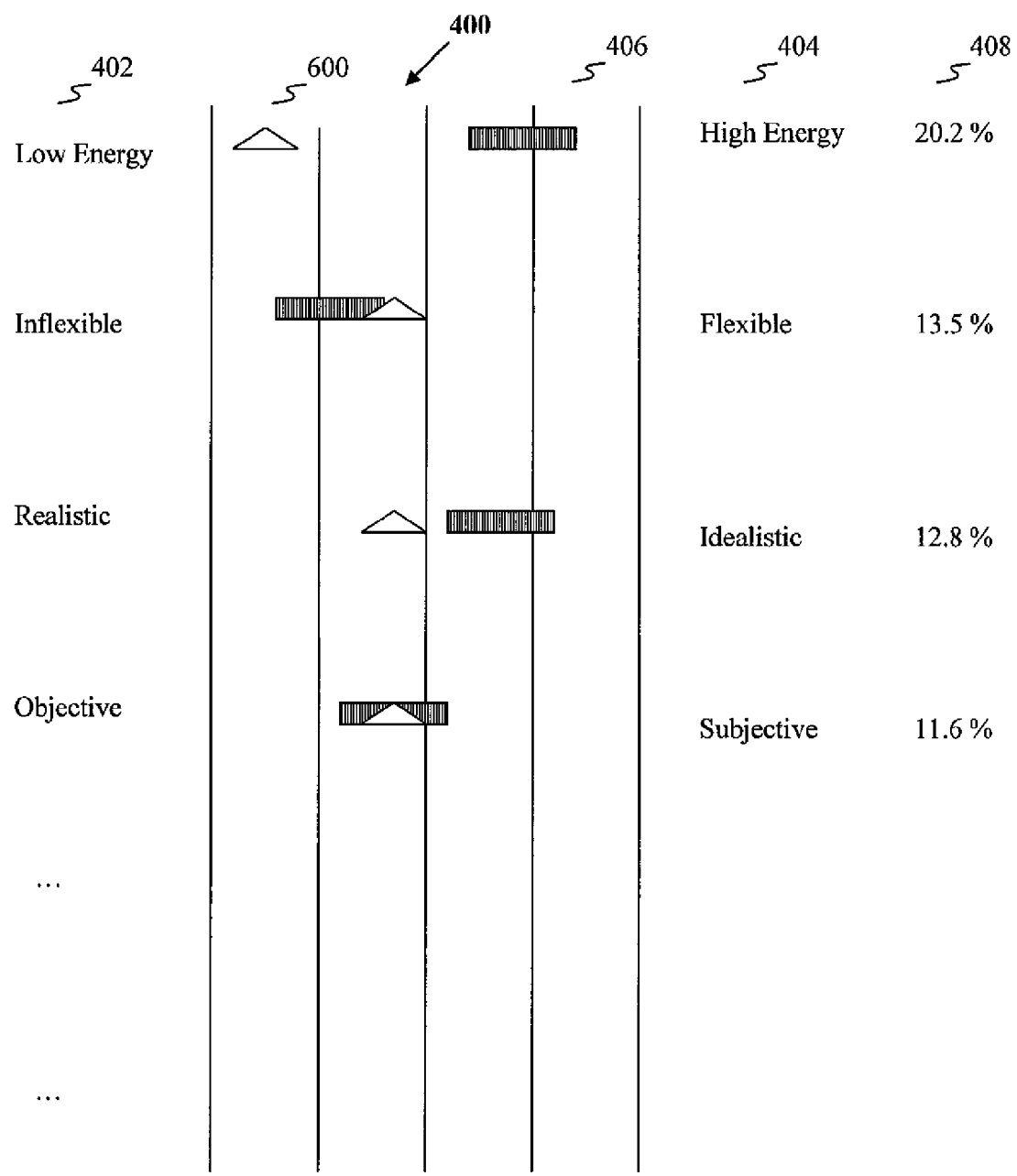
FIG. 6 illustrates a continuum with a candidate's dimension values shown in relation to ideal ranges according to an embodiment of the disclosure.

Another manner of communicating the dimension rating values is by displaying the candidate's dimension value in relation to the ideal range on a continuum. FIG. 6 illustrates continuum 400 with a candidate's dimension values 600 shown in relation to ideal ranges 406 according to an embodiment of the disclosure.

Returning to FIG. 5, the rating value for each composite is then calculated (block 508). The rating value of a composite is the weighted average of the rating values of its component dimensions. This forms a hierarchical tree of composites. The weights used to compute the weighted average are the dimension weights defined by the particular profile. Accordingly, the weight of the resulting composite would be the sum of the weights of its component dimensions. Each composite rating value is then communicated to the assessment readers in a way that makes it easier for the assessment reader to interpret the composite rating value (block 510). For example, like the dimension rating values, each composite rating value may be associated with a symbol that indicates how far away the composite rating value is from the ideal value. The composite rating values may use the same ranges as the dimension rating values. As with the dimension numeric ratings, the full numeric rating value for each composite may also be maintained internally as a decimal number to increase numeric precision and overall assessment accuracy.

Once the rating value for each composite has been calculated, the rating value for any parent composite is calculated (block 512). Just as dimensions roll up to form composites, composites can also roll up to form parent composites forming a hierarchical tree of composites. As with computing composites from component dimensions, a parent composite's rating value is the weighted average of the rating values of its component (child) composites. The parent composite will also have a weight equal to the sum of the child composite weights. Again, the full numeric rating value for each parent composite is typically maintained internally as a decimal number to increase numeric precision and overall assessment accuracy. A single overall composite is then determined for the candidate (block 514). The overall composite represents the final rating value for the candidate. Just as with the other scores, the overall rating value is most commonly represented internally as a decimal number. The overall rating value is then translated into a rating symbol, a recommendation statement, and a fit index score (block 516). While in this embodiment a number of intermediate composite stages are used to help a reviewer in understanding the feel and aggregation of the data, one of ordinary skill in the art would recognize that the representation could go directly from dimensions to an overall composite score.

As with the dimension rating values and the composite rating values, the rating symbol is assigned by identifying the symbol whose rating value range contains the overall rating value. For example, the rating symbol can be a color symbol as described earlier, or it can be a thumbs-type icon, such as thumbs up, thumbs down, or mixed thumbs.

Just as with the rating symbol, the assessment recommendation statement provided to the assessment reader is associated with a range of rating values. For example, a "recommended" statement may correspond to the thumbs up rating symbol. A "not recommended" statement may correspond to the thumbs down rating symbol. A "recommended with qualifications" statement may correspond to the higher side of the mixed thumbs rating symbol, and a "recommended with reservations" statement would correspond to the lower side of the mixed thumbs rating symbol.

To generate the fit index score for a particular overall rating value, a range of rating values are defined. For each range, the low and high end points of the range have fixed fit index score values associated with them. The system then identifies which of the rating value ranges contains the overall rating value. The system then applies linear interpolation to compute the specific fit index score for the overall rating value based upon the location of the overall rating value within the range.

By providing an assessment reader with a rating symbol, a recommendation statement, and a fit index score, the assessment reader is able to determine very quickly whether to select the candidate for progression through the interview process such as for an initial interview, a follow-up interview, or a job offer. The ability to quickly assess candidates is particular useful in situations in which large volumes of candidates are applying for a position. More time can be focused on the candidates who are more likely to perform well in a position.

Another advantage to the disclosed assessment report lies in the grouping of items into dimensions and composites. By grouping the items into dimensions and composites and scoring the dimensions and composites individually, the assessment reader is able to see how the candidate rates with regard to each area covered by the assessment. The assessment reader gets a better feel for the candidate because the assessment reader not only receives a fit index score but also receives all of the intermediary dimension and composite rating values that were used to arrive at the overall rating value. This provides the assessment reader with a breakdown of the strengths and weaknesses of the candidate. In some cases, the assessment reader may determine that the weaknesses of a particular candidate can be overcome with the proper coaching. This would not be possible if the assessment reader was simply given an overall assessment with no supporting data.

Having these intermediary values would be helpful, for example, to a recruiter in order to place a candidate in a position that emphasizes the candidate's strengths and minimizes the candidate's weaknesses. Also, rather than simply telling a candidate that they were not selected for an interview because his or her fit index was too low, a recruiter or organization can actually tell a candidate what areas caused the fit index to be low.

Such advantages are not provided by predictive assessments that merely predict how long a candidate will stay at a particular position. Such assessments do not tell an assessment reader how the system arrived at such predictions. The receivers of these assessments must rely on the fact that only relevant information was considered in reaching the prediction and that there was an actual correlation between the information considered and the prediction given.

Optimized Testing

As stated earlier, each dimension evaluated by survey 100 is associated with a particular behavioral trait such as high energy, numeric reasoning, analytical, or discipline. Each dimension utilizes a standard set of questions that are applied to all candidates who are tested for that particular dimension. The questions have an established history and understanding behind them. The questions are stable and only infrequently changed if at all. The idea behind optimized testing is obtaining the most relevant candidate assessment using the fewest number of questions. For some positions, it is not necessarily cost effective to assess the candidate in all possible dimensions in the system in order to get an accurate assessment because certain behavioral traits will be far more predictive of fit than others. In such cases, an organization determines which dimensions are most predictive, and an optimized survey is created centered around those dimensions. This allows an accurate assessment to be made with a shorter, more concise question set without changing the standard questions or changing the questions used in relation to a particular dimension.

Figure 7:
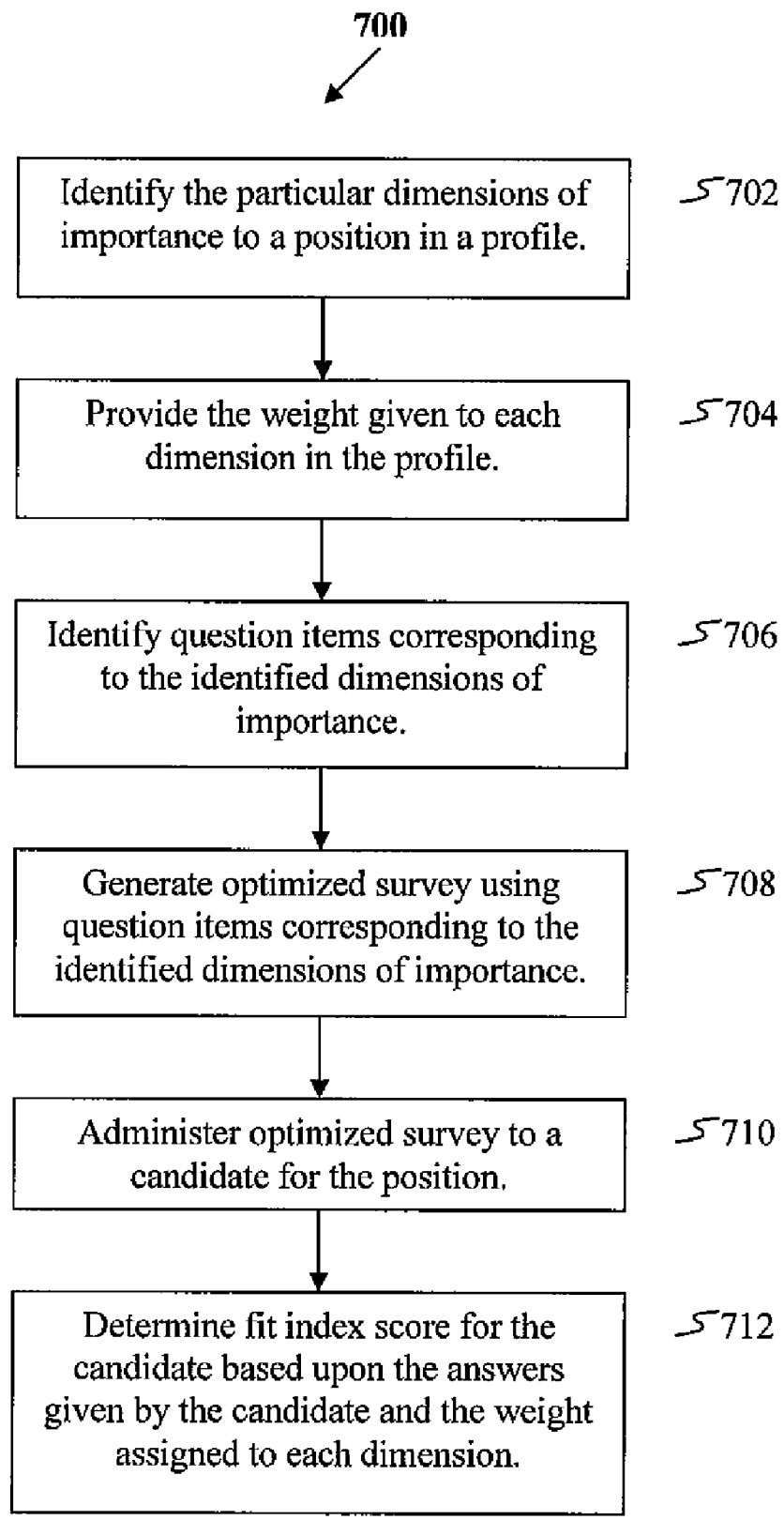
FIG. 7 shows a method of testing a candidate using an optimized survey according to an embodiment of the disclosure.

FIG. 7 shows a method 700 of testing a candidate using an optimized survey according to an embodiment of the disclosure. The particular dimensions of importance to a position are identified in a profile (block 702). The weight given to each dimension is provided by the profile (block 704). The question items corresponding to the identified dimensions are then identified (block 706). An optimized survey is then generated using the items corresponding to the identified dimensions (block 708). The optimized survey is then administered to a candidate for the position (block 710). A fit index for the candidate is then determined based upon the answers given by the candidate and the weight assigned to each dimension (block 712).

Figure 8:
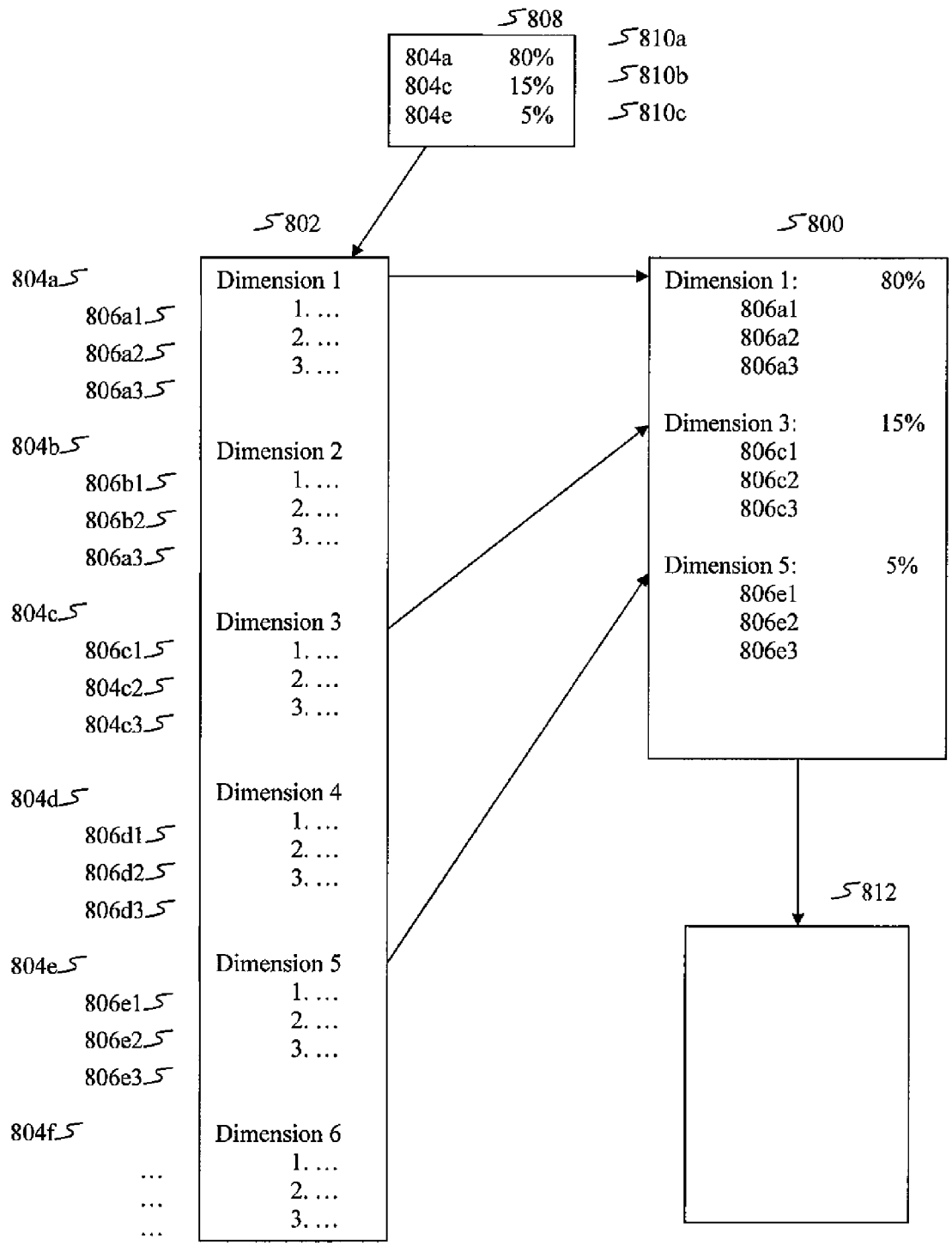
FIG. 8 illustrates the components of an optimized survey according to an embodiment of the disclosure.

FIG. 8 illustrates the components of an optimized survey according to an embodiment of the disclosure. In this embodiment, a standardized question set 802 includes six dimensions 804a, 804b, 804c, 804d, 804e, and 804f. Each dimension 804 includes three questions or items 806a1, 806a2, 806 a3, . . . 806f1, 806f2, 806f3. A profile 808 is shown indicating that dimensions 804a, 804c, and 804e and their corresponding weights 810a, 810b, and 810c are associated with profile 808. Optimized survey 800 is then created containing items 806 of dimensions 804a, 804c, and 804e from standardized question set 802 as indicated in profile 808. An assessment report 812 is then generated from the answers given by the candidate on optimized survey 800 and the weight assigned to each dimension.

The disclosed method and system does not generate the optimized survey by using cyclic refinement of item questions. Methods that utilize cyclic refinement typically place an item or question into a pool of questions and monitor that item in subsequent cycles of testing to determine whether it is effective or not. If the item is determined to be ineffective after subsequent testing, it is removed from the question set. This type of cyclic refinement takes place over a period of time after several cycles and is indicative of a method that utilizes items or questions with no established history or understanding behind them. Therefore, the items must be monitored to determine their effectiveness.

By contrast, the disclosed method uses a standard question set with an established history and understanding behind them. The effectiveness of these questions has already been established through extensive use in testing. Therefore, there is no need to monitor them in order to determine their effectiveness. In one embodiment, the changes from one optimized survey to another are the dimensions tested and the weights given to the particular dimensions.

Tracking Candidate Sourcing Campaigns

As stated earlier, the costs associated with identifying and hiring for a vacant position include advertising, an employment agency, employee referral award, Internet posting and other forms of announcing the availability of the position. When multiple candidate sourcing campaigns are used, it would be helpful for an organization to quickly determine which campaign or campaigns provide the better return on investment. Having this information helps to reduce the cost associated with employee turnover.

Figure 9:
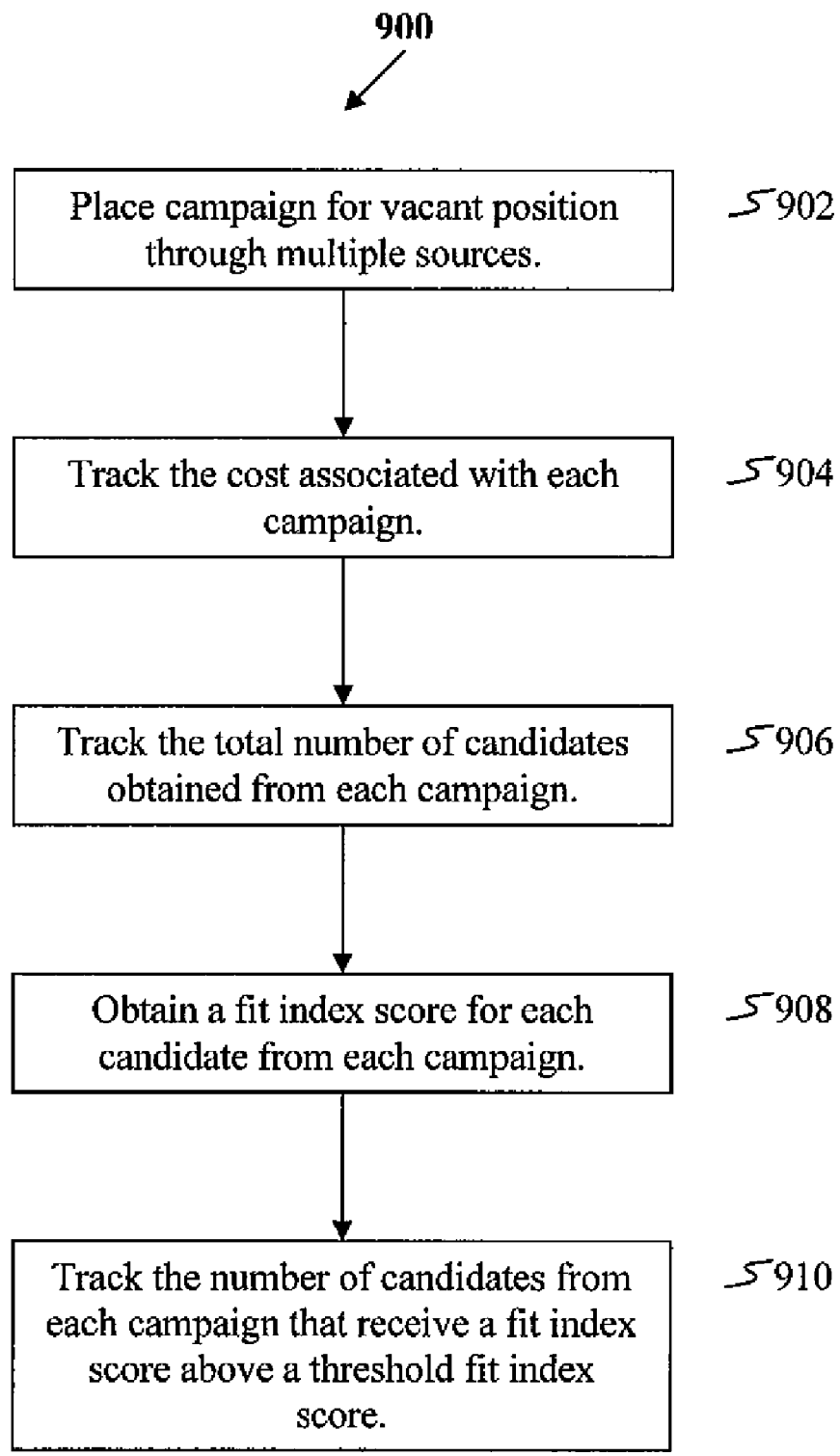
FIG. 9 shows a method of determining the best source of quality candidates according to an embodiment of the disclosure.

FIG. 9 shows a method 900 of determining the best source of quality candidates according to an embodiment of the disclosure. In this embodiment, method 900 begins by placing campaigns for a vacant position in an organization through multiple providers such a newspaper, an Internet posting, and an employment agency (block 902). The cost associated with each campaign is tracked (block 904). The total number of candidates obtained from each campaign is also tracked (block 906). A fit index score is then obtained for each candidate from each campaign (block 908). The number of candidates from each campaign that receives a fit index score above a threshold fit index score (i.e., the number of quality candidates) is also tracked (block 910). Information, such as the cost associated with each campaign, the total number of candidates received from each campaign, and the total number of quality candidates, received from each campaign is used to provide the organization with information that allows the organization to determine which campaign source provides the organization with the best return on its investment. Such information may include cost per quality candidate by source, cost per hire by source, and quality candidates by source. The organization is better able to determine where to spend its money. For example, if the organization determines that the most important factor is the total number of quality candidates that each source produces, then the organization would look at number of quality candidates by source. On the other hand, if the organization is more interested in the cost of obtaining each quality candidate, then the organization would look at the cost per quality candidate by source. In either case, the organization is able to use the information provided by the method to determine which campaign or campaigns are the best source of candidates for it and select and do business with those providers. A source may be multiple campaigns with one provider, each of which is a source or individual campaign. A source may also be individual campaigns with each of multiple providers or both. In such cases, the candidates could be tracked by provider, as well as by campaign. Information, such as cost by provider, campaign costs across multiple providers, or campaign results across multiple providers, could be provided to the organization.

Figure 10:
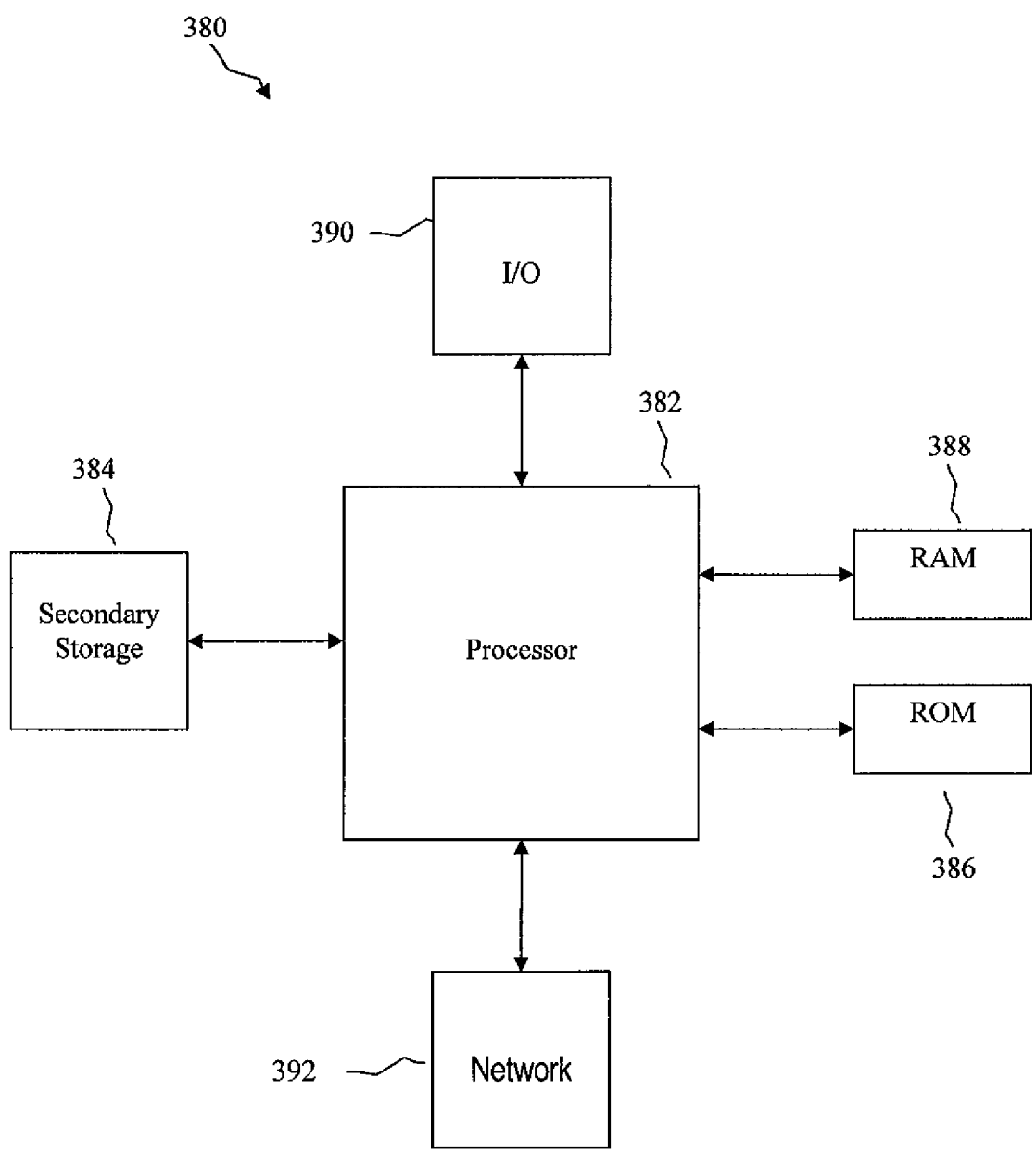
FIG. 10 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 10 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computer-implemented method of selecting potential hires for progression through a hiring process, comprising:
    selecting at least one measured performance indicator for a position;
    obtaining the at least one measured performance indicator for a plurality of incumbents in the position;
    placing each incumbent in the plurality of incumbents along a performance continuum according to their measured performance indicator;
    surveying incumbents from at least a portion of a top half and a portion of a bottom half of the performance continuum;
    generating, by a processor, an optimal profile for the position based upon a plurality of the incumbent surveys from the portion of the top half of the performance continuum, a plurality of the incumbent surveys from the portion of the bottom half of the performance continuum, and the at least one measured performance indicator of the incumbents, wherein the optimal profile increases a probability of success and reduces a probability of failure of potential hires by considering the plurality of the incumbent surveys from the portion of the top half of the performance continuum and the plurality of the incumbent surveys from the portion of the bottom half of the performance continuum in relationship to the measured performance indicators of the incumbents completing the plurality of the incumbent surveys;
    generating, by a processor, a candidate profile of a potential hire based on a survey administered to the potential hire;
    comparing, by a processor, the candidate profile of the potential hire with the optimal profile for the position to determine a result for the potential hire; and
    determining whether to progress the potential hire to a next stage in the hiring process based upon the result.

2. The computer-implemented method of claim 1, wherein the measured performance indicator is selected from a group consisting of sales numbers, call center numbers, management numbers, individual contribution numbers, customer service numbers, and training numbers.

3. The computer-implemented method of claim 1, wherein the measured performance indicator is a direct performance indicator or an indirect performance indicator.

4. The computer-implemented method of claim 1, wherein the incumbents surveyed also include incumbents in a mid-range of the performance continuum.

5. The computer-implemented method of claim 1, wherein the survey used for the incumbents and the survey used for the potential hire are the same survey.

6. The computer-implemented method of claim 1, wherein the result is selected from a group consisting of an overall rating value, a fit index, a recommendation statement, and a rating symbol.

7. The computer-implemented method of claim 1, wherein the potential hire is selected to progress to an interview.

8. The computer-implemented method of claim 1, wherein the potential hire is selected to progress to a job offer.

9. A computer-implemented system for selecting potential hires for progression through a hiring process, comprising:
a non-transitory computer-readable medium comprising a set of instructions executable by a processor, the set of instructions executable to configure the processor to:
receive a survey completed by a potential hire for a position and a plurality of incumbents in the position, the plurality of incumbents including both high performers and low performers relative to an identified measured performance indicator;
generate a candidate profile of the potential hire by analyzing the survey completed by the potential hire;
generate an optimal profile for the position by analyzing a plurality of the incumbent surveys completed by the high performers and a plurality of the incumbent surveys completed by the low performers, wherein the optimal profile increases a probability of success and reduces a probability of failure of potential hires by considering the plurality of the incumbent surveys completed by the top performers and the plurality of the incumbent surveys completed by the bottom performers in relationship to the measured performance indicators of the incumbents completing the plurality of the incumbent surveys; and
generate a result for the potential hire by comparing the candidate profile of the potential hire with the optimal profile for the position;
wherein a determination of whether to progress the potential hire is made based upon the result.

10. The computer-implemented system of claim 9, wherein the measured performance indicator is selected from a group consisting of sales numbers, call center numbers, management numbers, individual contribution numbers, customer service numbers, and training numbers.

11. The computer-implemented system of claim 9, wherein the measured performance indicator is a direct performance indicator.

12. The computer-implemented system of claim 9, wherein the measured performance indicator is an indirect performance indicator.

13. The computer-implemented system of claim 9, wherein the incumbents surveyed also include incumbents in a mid-range of the performance continuum.

14. The computer-implemented system of claim 9, wherein the survey used for the incumbents and the survey used for the potential hire are the same survey.

15. The computer-implemented system of claim 9, wherein the result is selected from the group consisting of an overall rating value, a fit index, a recommendation statement, and a rating symbol.

16. The computer-implemented system of claim 9, wherein the potential hire is selected to progress to an interview.

17. The computer-implemented system of claim 9, wherein the potential hire is selected to progress to a job offer.

18. A computer-implemented method of determining an optimal range for a behavioral characteristic for a position at a company, comprising:
receiving a completed survey from each of a plurality of incumbents in a position,
the survey comprising a group of two or more items,
the group of items corresponding to the behavioral characteristic, and
the plurality of incumbents including both high performers and low performers relative to an identified measured performance indicator;
plotting results of a plurality of the incumbent surveys from the high performers and a plurality of the incumbent surveys from the low performers on a continuum;
determining, by a processor, an optimal range for the behavioral characteristic for the position based upon the results of the plurality of the incumbent surveys from the high performers and the results of the plurality of the incumbent surveys from the low performers, wherein the optimal range increases a probability of success and reduces a probability of failure of potential hires by considering the plurality of the incumbent surveys from the top performers and the plurality of the incumbent surveys from the bottom performers in relationship to the measured performance indicators of the incumbents completing the plurality of incumbent surveys; and
determining, by a processor, where the optimal range falls on the continuum;
wherein the optimal range is between but not inclusive of the endpoints of the continuum.

19. The computer-implemented method of claim 18, further comprising:
having the survey comprise a plurality of groups of items, each group corresponding to a different behavioral characteristic; and
determining the optimal range for each behavioral characteristic.

20. The computer-implemented method of claim 19, further comprising:
administering the survey to a potential hire; and
providing to a survey reader the results for each behavioral characteristic.

21. The computer-implemented method of claim 19, further comprising assigning varying weights of importance to each group of items.

22. A computer-implemented method of determining the more effective source for sourcing candidates, comprising:
receiving a first group of candidates for a position from a first source;
receiving a second group of candidates for the position from a second source;
generating, by a processor, an optimal profile for the position based upon a first survey of a group of incumbents in the position and an at least one measured performance indicator of the incumbents;
generating, by a processor, a candidate profile based upon a candidate survey for each candidate in both groups;
determining, by a processor, a result for each candidate in both groups based upon the comparison of the candidate survey with the optimal profile;
tracking, by a processor, a measurement of candidates from each group that receive results over a threshold result;

determining whether the first or the second source is the more effective source for sourcing candidates based on the measurement of candidates from each group that receive results over the threshold result; and selecting the more effective source for sourcing candidates based on the measurement of candidates.

23. The computer-implemented method of claim 22, wherein the first source is selected from the group consisting of an employment agency, an Internet posting, and a newspaper advertising.

24. The computer-implemented method of claim 22, wherein the second source is selected from the group consisting of an employment agency, an Internet posting, and a newspaper advertising.

25. The computer-implemented method of claim 22, wherein the first and second sources are from the same provider.

26. The computer-implemented method of claim 22, further comprising providing an organization associated with the position with an assessment of the sources.

27. The computer-implemented method of claim 26, wherein the assessment is selected from the group consisting of a cost per candidate over the threshold result, a cost per hire, a candidate flow by position, a candidate over the threshold result by source, and a candidate over the threshold result by position.

28. The computer-implemented method of claim 26, wherein the determination of whether the first or the second source is the more effective source for sourcing candidates is made by also considering a secondary factor.

29. The computer-implemented method of claim 28, wherein the secondary factor is selected from the group consisting of education, work experience, skill level, and training.

30. The computer-implemented method of claim 28, wherein the threshold result is an average of the results for all of the candidates.

* * * * *